United States Patent
Lumb et al.

(10) Patent No.: US 9,662,857 B2
(45) Date of Patent: May 30, 2017

(54) STITCHED MULTI-LAYER FABRIC

(71) Applicant: SWNR Development, LLC, Pagosa Springs, CO (US)

(72) Inventors: Douglas Stanley Lumb, Methuen, MA (US); Daniel L. English, Pagosa Springs, CO (US)

(73) Assignee: SWNR Development, LLC, Pagosa Springs, CO (US)

( * ) Notice: Subject to any disclaimer, the term of this patent is extended or adjusted under 35 U.S.C. 154(b) by 0 days.

(21) Appl. No.: 14/861,827

(22) Filed: Sep. 22, 2015

(65) Prior Publication Data

US 2016/0009052 A1 Jan. 14, 2016

Related U.S. Application Data

(60) Division of application No. 14/158,957, filed on Jan. 20, 2014, now Pat. No. 9,272,486, which is a
(Continued)

(51) Int. Cl.
| | |
|---|---|
| B32B 7/08 | (2006.01) |
| B32B 5/06 | (2006.01) |
| B32B 5/02 | (2006.01) |
| B32B 5/24 | (2006.01) |
| B32B 7/12 | (2006.01) |
| B32B 27/12 | (2006.01) |
| B32B 27/40 | (2006.01) |
| B32B 37/04 | (2006.01) |

(Continued)

(52) U.S. Cl.
CPC ............... *B32B 5/06* (2013.01); *B32B 5/022* (2013.01); *B32B 5/245* (2013.01); *B32B 5/26* (2013.01); *B32B 7/08* (2013.01); *B32B 7/12* (2013.01); *B32B 27/12* (2013.01); *B32B 27/40* (2013.01); *B32B 37/04* (2013.01); *B32B 37/06* (2013.01); *B32B 2262/0261* (2013.01); *B32B 2262/0276* (2013.01); *B32B 2262/062* (2013.01); *B32B 2262/08* (2013.01); *B32B 2307/724* (2013.01); *B32B 2307/7265* (2013.01); *B32B 2437/00* (2013.01); *B32B 2535/00* (2013.01); *Y10T 428/24033* (2015.01)

(58) Field of Classification Search
CPC ..................... Y10T 428/24033; B32B 7/08
See application file for complete search history.

(56) References Cited

U.S. PATENT DOCUMENTS

| | | |
|---|---|---|
| 891,594 A | 6/1908 | Cornely |
| D105,908 S | 8/1937 | Weisler |

(Continued)

OTHER PUBLICATIONS

Office Action dated Feb. 6, 2015, 8 pages, U.S. Appl. No. 13/436,200, filed Mar. 30, 2012.
(Continued)

*Primary Examiner* — Alexander Thomas
(74) *Attorney, Agent, or Firm* — Conley Rose, P.C.; William H. Dietrich

(57) ABSTRACT

A stitched multi-layer fabric including a face layer, a barrier layer disposed over the face layer, where the barrier layer is configured to inhibit fluid flow, a batting layer disposed over the barrier layer, a first yarn disposed over the batting layer, and a second yarn securing the first yarn to the batting layer, securing the face layer, the barrier layer, and the batting layer together, and forming stitch holes in the barrier layer. A melted portion of the barrier layer fills a portion of the stitch holes in the barrier layer.

9 Claims, 9 Drawing Sheets

Related U.S. Application Data continuation-in-part of application No. 13/529,862, filed on Jun. 21, 2012, now Pat. No. 9,028,944, which is a continuation-in-part of application No. 13/435,854, filed on Mar. 30, 2012, now Pat. No. 8,597,760.

(51) Int. Cl.
*B32B 37/06* (2006.01)
*B32B 5/26* (2006.01)

(56) References Cited

U.S. PATENT DOCUMENTS

| | | | |
|---|---|---|---|
| 2,372,632 | A | 3/1945 | Webb |
| 3,281,205 | A | 10/1966 | Runton |
| 3,357,076 | A | 12/1967 | Greenwald et al. |
| 3,452,411 | A | 7/1969 | Brown |
| 3,697,219 | A | 10/1972 | Richards |
| 3,965,943 | A | 6/1976 | Goff, Jr. et al. |
| 4,125,922 | A | 11/1978 | Irwin |
| 4,821,780 | A | 4/1989 | Tate |
| 4,981,742 | A | 1/1991 | Haigh |
| 5,102,724 | A | 4/1992 | Okawahara et al. |
| 5,478,514 | A | 12/1995 | Hamilton |
| 5,694,981 | A | 12/1997 | Stanhope |
| 5,885,679 | A | 3/1999 | Yasue et al. |
| 6,488,311 | B2 | 12/2002 | Kato et al. |
| 6,821,601 | B2 | 11/2004 | Tsiarkezos et al. |
| 7,461,499 | B2 | 12/2008 | Liao |
| 2006/0165939 | A1 | 7/2006 | Hottner |
| 2008/0229484 | A1 | 9/2008 | Baychar |
| 2009/0011672 | A1 | 1/2009 | Gao et al. |
| 2009/0260126 | A1 | 10/2009 | Rock et al. |
| 2010/0075557 | A1 | 3/2010 | Shteiyer |
| 2011/0120588 | A1 | 5/2011 | Shteiyer |

OTHER PUBLICATIONS

Office Action dated May 21, 2015, 13 pages, U.S. Appl. No. 13/436,200, filed Mar. 30, 2012.

Office Action dated Jun. 5, 2014, 10 pages, U.S. Appl. No. 13/436,200, filed Mar. 30, 2012.

Office Action dated Sep. 13, 2013, 7 pages, U.S. Appl. No. 13/436,200, filed Mar. 30, 2012.

Office Action dated Oct. 6, 2014, 10 pages, U.S. Appl. No. 13/436,200, filed Mar. 3, 2012.

Office Action dated Oct. 25, 2013, 8 pages, U.S. Appl. No. 13/436,200, filed Mar. 3, 2012.

Notice of Allowance dated Mar. 4, 2015, 8 pages, U.S. Appl. No. 13/529,862, filed Jun. 21, 2012.

Office Action dated Sep. 17, 2014, 7 pages, U.S. Appl. No. 13/529,862, filed Jun. 21, 2012.

Office Action dated Dec. 23, 2014, 8 pages, U.S. Appl. No. 13/529,862, filed Jun. 21, 2012.

Office Action dated Jun. 22, 2015, 6 pages, U.S. Appl. No. 14/158,957, filed Jan. 20, 2014.

Office Action dated Sep. 2, 2015, 16 pages, U.S. Appl. No. 14/158,957, filed Sep. 2, 2015.

Office Action dated Dec. 9, 2015, 6 pages, U.S. Appl. No. 14/158,957, filed Jan. 20, 2014.

Notice of Allowance dated Dec. 23, 2015, 8 pages, U.S. Appl. No. 14/158,957, filed Jan. 20, 2014.

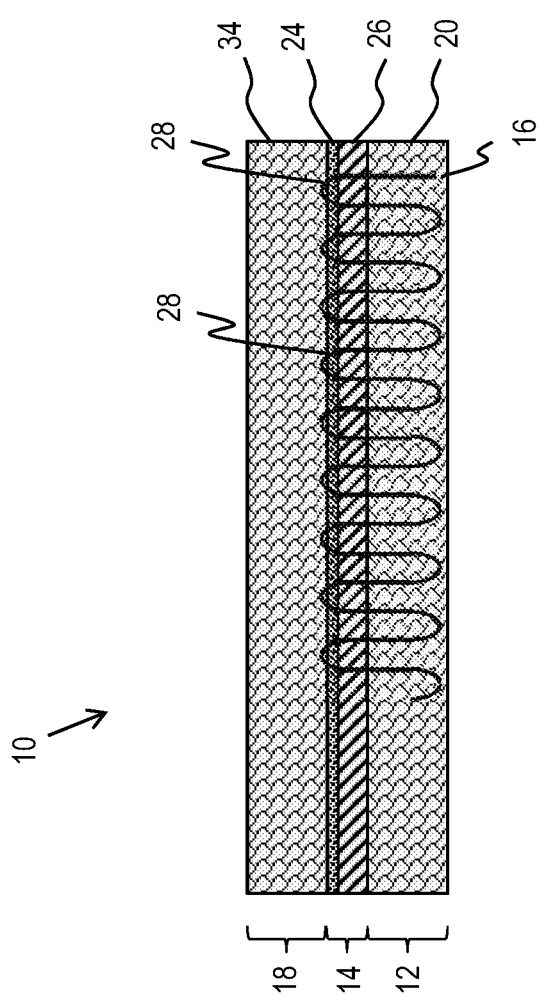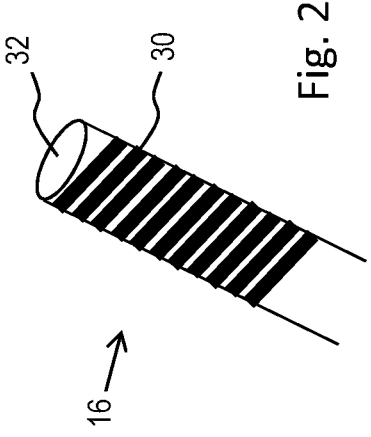

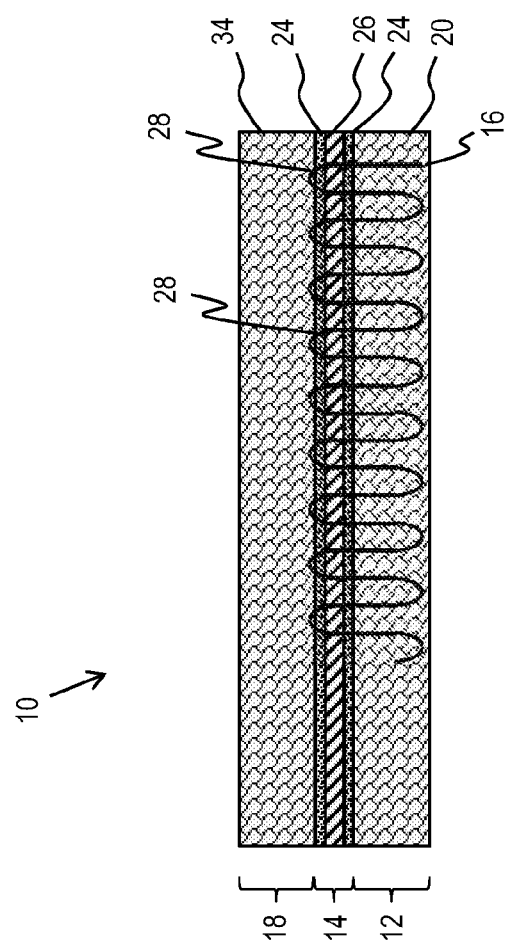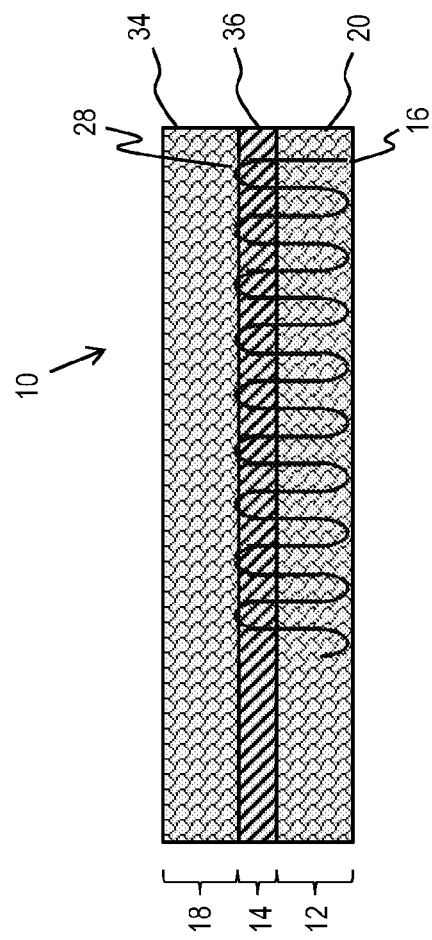

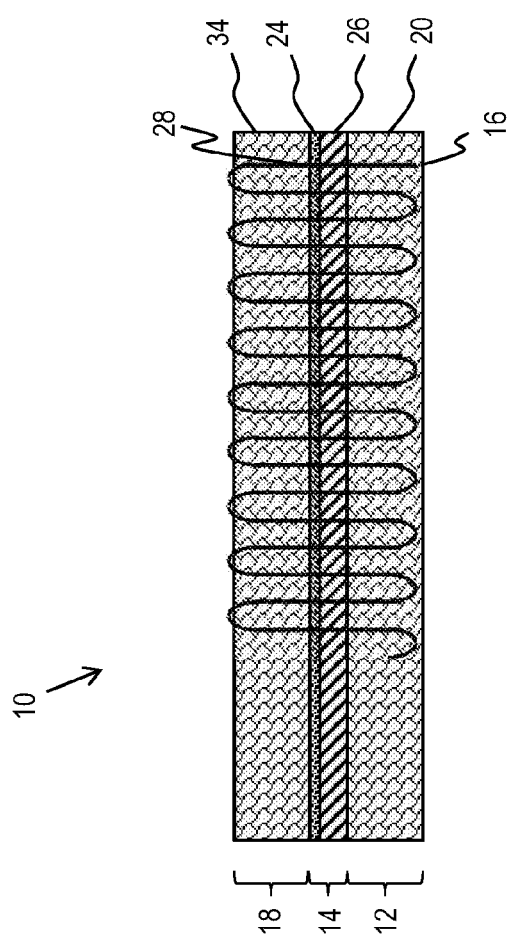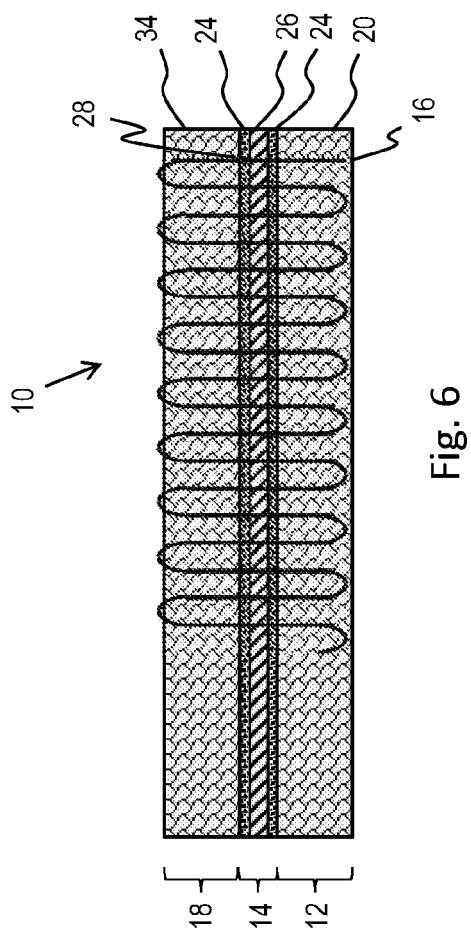

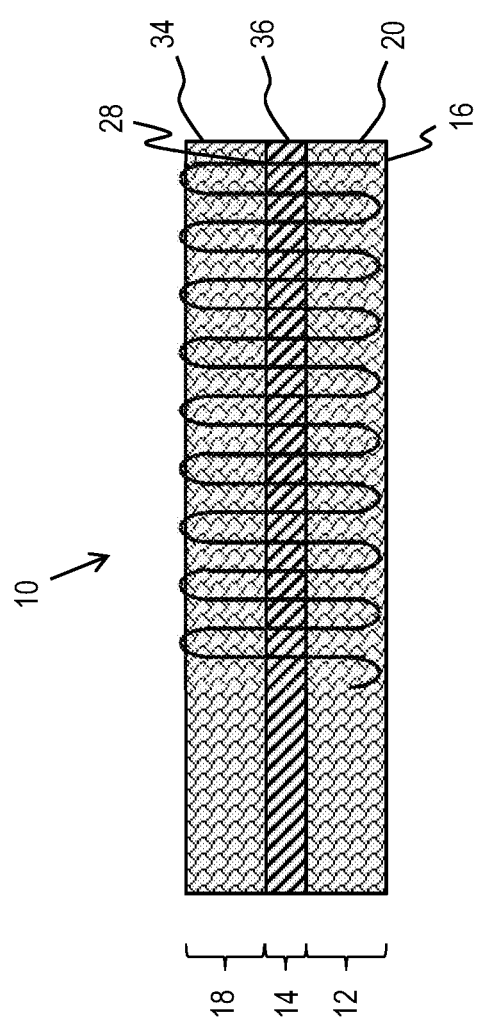

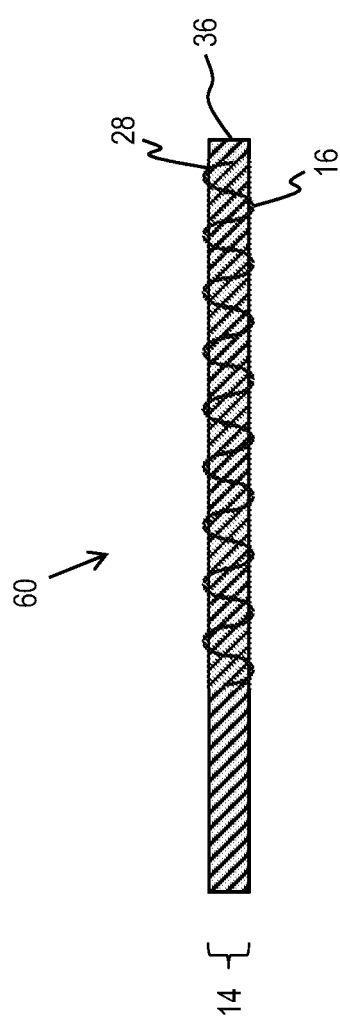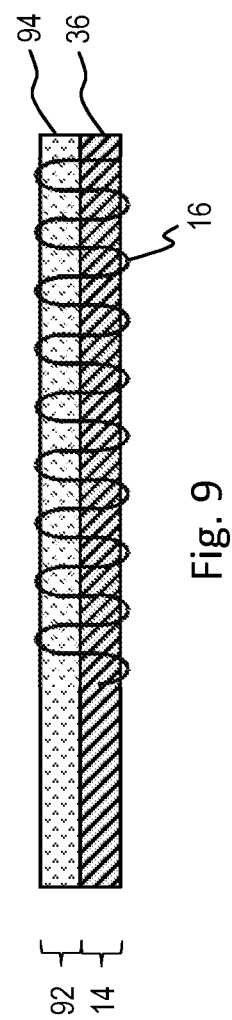

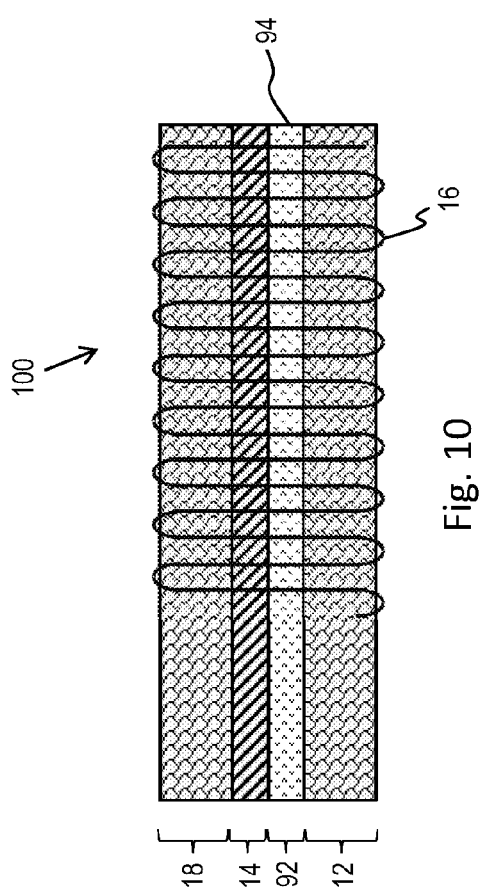
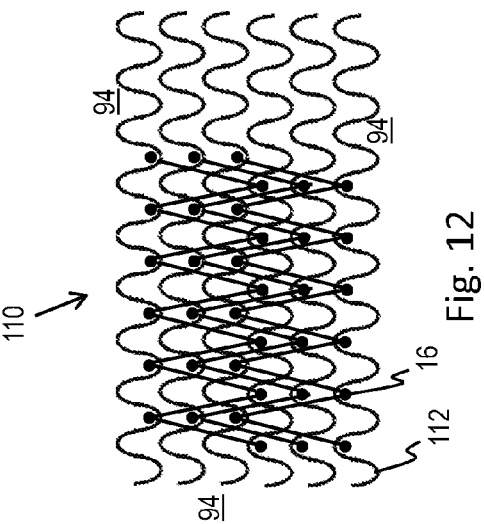
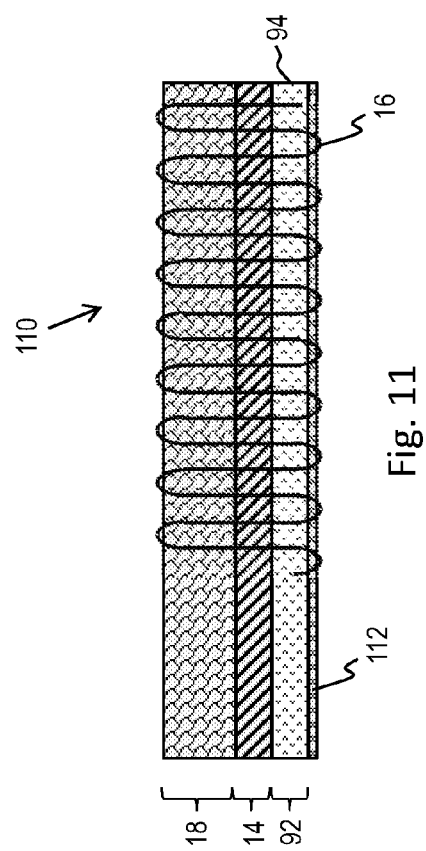

STITCHED MULTI-LAYER FABRIC

This application is a divisional of U.S. patent application Ser. No. 14/158,957, entitled "Stitched Multi-Layer Fabric," filed on Jan. 20, 2014, now U.S. Pat. No. 9,272,486 which is a continuation-in-part of U.S. patent application Ser. No. 13/529,862, entitled "Stitched Multi-Layer Fabric," filed on Jun. 21, 2012, now U.S. Pat. No. 9,028,944 which is a continuation-in-part of U.S. patent application Ser. No. 13/435,854, now U.S. Pat. No. 8,597,760, entitled "Stitched Multi-Layer Fabric," filed on Mar. 30, 2012, each of which is incorporated herein by reference.

BACKGROUND

Textile manufacturers, garment makers, and others in similar industries have a continuing goal of creating or making available to consumers the most comfortable product for the intended end use.

Several factors, either alone or in combination, may affect the overall comfort of a particular product. These factors may include, but are not limited to, whether or to what extent the product is air permeable, breathable, water resistant or waterproof, or stretchable.

In an attempt to provide or maximize these qualities, the product may be manufactured using certain fabrics. The fabrics may be chosen for their inherent qualities (e.g., naturally breathable, etc.) or may be amenable to certain processes (e.g., waterproofing, etc.) so they will improve the comfort of the finished product.

Despite the above, making or providing a product that performs well in each category of permeability, breathability, water resistance, and stretch and, therefore, provides a high level of comfort, has proven to be a challenge.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 1 is a cross section of an embodiment of a stitched multi-layer fabric having a barrier layer formed from and adhesive and a membrane or a film;

FIG. 2 is a perspective view of an embodiment yarn used in the fabric of FIG. 1;

FIG. 3 is a cross section of an embodiment of the stitched multi-layer fabric of FIG. 1 where the barrier layer includes adhesive on opposing sides of the membrane or the film;

FIG. 4 is a cross section of an embodiment of the stitched multi-layer fabric of FIG. 1 where the barrier layer is formed solely from a meltable water-resistant film;

FIG. 5 is a cross section of an embodiment of the stitched multi-layer fabric of FIG. 1 where the yarn has been stitched through each of the layers;

FIG. 6 is a cross section of an embodiment of the stitched multi-layer fabric of FIG. 3 where the yarn has been stitched through each layer;

FIG. 7 is a cross section of an embodiment of the stitched multi-layer fabric of FIG. 4 where the yarn has been stitched through each layer;

FIG. 8 is an embodiment of a stitched single-layer fabric free of an interior layer and a face layer found in the stitched multi-layer fabric of FIG. 1;

FIG. 9 is a cross section of an embodiment of a stitched multi-layer fabric including a batting layer;

FIG. 10 is a cross section of an embodiment of a stitched multi-layer fabric including a batting layer;

FIG. 11 is a cross section of an embodiment of a stitched multi-layer fabric including a batting layer;

FIG. 12 is a bottom view of the fabric of FIG. 11 illustrating an embodiment configuration of the yarns;

DETAILED DESCRIPTION OF ILLUSTRATIVE EMBODIMENTS

Figure 13:
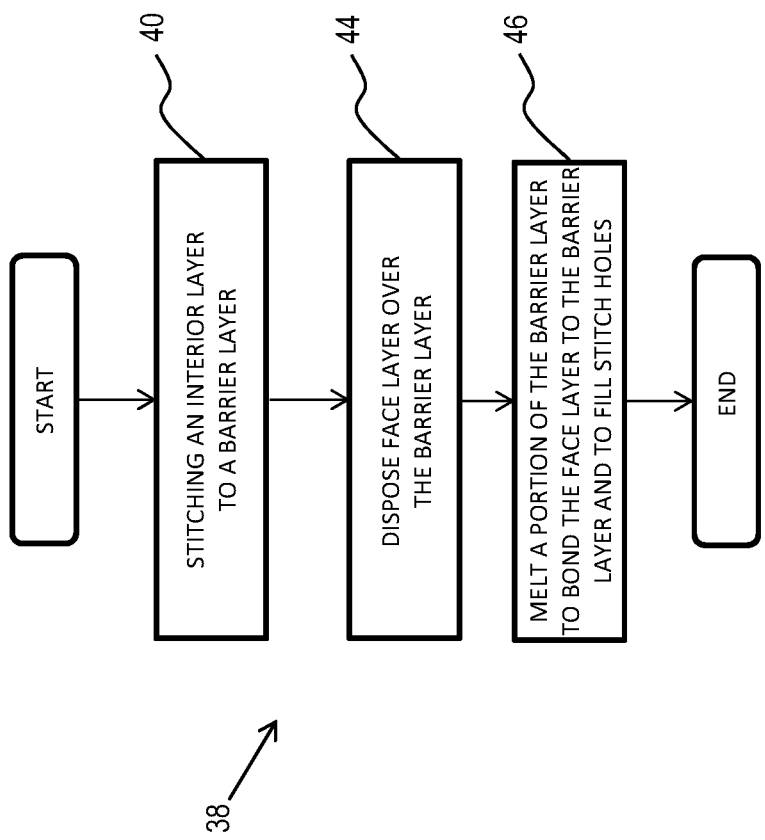
FIG. 13 is an embodiment of a method of forming the stitched multi-layer fabric of FIG. 1.

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Referring to FIG. 1, an embodiment stitched fabric 10 is illustrated. As will be more fully explained below, the fabric 10 provides good breathability, water and wind resistance, and stretch. Therefore, the fabric 10 may have a variety of suitable uses (e.g., in a garment suitable for outdoor use, in a medical bandage, in a blanket for people or animals, etc.). In those instances where used in a garment, the fabric 10 provides a high level of comfort for the wearer. As shown in FIG. 1, the fabric 10 generally includes an interior layer 12, a barrier layer 14, a yarn 16, and a face layer 18.

The interior layer 12 is a knitted, woven, or non-woven fabric 20 formed using natural fibers (e.g., cotton, wool, silk, linen, etc.), synthetic fibers (e.g., nylon, polyester, etc.), or a blend of natural and synthetic fibers. In an embodiment, the interior layer 12 is a light-weight, durable, machine-washable fabric 20 with multi-direction stretch and good hand (e.g., feel). In an embodiment, the interior layer 12 provides horizontal and vertical stretch of thirty percent (30%) or more. In an embodiment, the interior layer 12 provides horizontal and vertical stretch of fifteen percent (15%) or more. When used in a garment, the interior layer 12 is generally oriented to engage or face toward the wearer.

Still referring to FIG. 1, the barrier layer 14 is configured to inhibit fluid flow. In other words, the barrier layer 14 is generally water resistant or waterproof Therefore, the barrier layer 14 functions to discourage fluid flow through the fabric 10. In addition, in an embodiment the barrier layer 14 is also windproof, yet still permits the fabric 10 to be breathable. In other words, the barrier layer 14 is able to block wind from undesirably passing through the fabric 10 while still permitting moisture vapor generated by, for example, body heat to be dissipated. In an embodiment, the barrier layer 14 is stretchable or suitably elastomeric in order to compliment the degree of stretch afforded by the interior layer 12 and the face layer 18.

In an embodiment, the barrier layer 14 comprises an adhesive 24 and an intermediate material 26 (e.g., a porous membrane or a non-porous film) as shown in FIG. 1. In an embodiment, the barrier layer 14 may include several adhesive 24 layers and/or several intermediate layers 26.

A melting point of the adhesive 24 is generally lower than a melting point of the intermediate material 26. Therefore, the adhesive 24 may be melted without also melting the intermediate material 26. In other words, the adhesive 24 may be forced to flow through the application of sufficient heat without flowing, or compromising the integrity of, the intermediate material 26.

In an embodiment, the melting point of the adhesive 24 may be between about 140° C. to about 180° C. (about 284° F. to about 356° F.) while the melting point of the intermediate material 26 exceeds about 180° C. (about 356° F.). Where the adhesive 24 and the intermediate material 26 have different distinct melting points as noted above, the barrier layer 14 may be referred to as having an "A-B" type format. In an embodiment, the adhesive 24 is approximately two thousandths of an inch (i.e., 2 mils) and the intermediate material 26 is approximately one thousandth of an inch (i.e., 1 mil).

In general, the adhesive 24 is a thermoplastic, copolyamide, or other suitably meltable type of material capable of bonding two layers of fabric together. A variety of different adhesives 24 may be used in the barrier layer 14. By way of example, the adhesive 24 may be a high-quality textile adhesive such a polyurethane adhesive film, an ethylene-vinyl acetate, and the like. In an embodiment, the adhesive 24 may be heat sensitive, pressure sensitive, or both.

The intermediate material 26 of the barrier layer 14 may be either a membrane or a film formed from a variety of different materials. In an embodiment, the intermediate material 26 is formed from polyurethane, polyester, urethane, polyether, polytetrafluoroethylene (PTFE), or another polymer-based material. The intermediate material 26 may be manufactured using, for example, an extrusion, a melt blowing, or an electrospinning process.

As shown in FIG. 1, the interior layer 12 and the barrier layer 14 are stitched together with the yarn 16. As such, the yarn 16 secures the interior layer 12 and barrier layer 14 together. In an embodiment the yarn 16 is non-contractible. As shown in FIG. 2, in another embodiment the yarn 16 is contractible. In such an embodiment, the yarn 16 may be formed by wrapping nylon 30 around spandex 32 (e.g., Lycra®, elastane, etc.). A conventional covering process may be employed to perform the wrapping process. In another embodiment, materials other than nylon 30 and spandex 32 may be used.

In an embodiment, the yarn 16 has approximately seventeen turns per inch (17 TPI) (i.e., the nylon 30 is wrapped around the spandex 32 approximately seventeen times every inch). In an embodiment, the nylon 30 is wrapped around the spandex 32 while the spandex has a draft of approximately two and a half times (i.e., the spandex 32 has been stretched to two and a half times its original length). In an embodiment, the spandex 32 is a forty (40) denier fiber.

During the stitching process, the yarn 16 forms stitch holes 28 through the interior layer 12 and the barrier layer 14 as shown in FIG. 1. As will be more fully explained below, some or all of the stitch holes 28 are partially or fully filled when the barrier layer 14 is sufficiently heated. For example, the adhesive 24 of the barrier layer 14 may be heated to a thermoplastic state, which allows a portion of the adhesive to flow and plug a portion of the stitch holes 28 in the barrier layer 14.

The face layer 18 is a knitted, woven, or non-woven fabric 34 formed using natural fibers (e.g., cotton, wool, silk, linen, etc.), synthetic fibers (e.g., nylon, polyester, etc.), or a blend of natural and synthetic fibers. In an embodiment, the face layer 18 is a light-weight, durable, machine-washable fabric 34 with multi-direction stretch and good hand (e.g., feel). In an embodiment, the face layer 18 provides horizontal and vertical stretch of thirty percent (30%) or more. In an embodiment, the face layer 18 provides horizontal and vertical stretch of between about fifteen percent (15%) and about forty-five percent (45%). When used in a garment, the face layer 18 generally faces away from the wearer. In an embodiment, the face layer 18 and the interior layer 12 are formed from the same or a substantially similar fabric. In another embodiment, the face layer 18 and the interior layer 12 are formed from different types of fabric.

Referring now to FIG. 3, in an embodiment the barrier layer 14 of the fabric 10 may include an additional layer of the adhesive 24. As shown, the adhesive 24 is disposed on opposing sides of the intermediate material 26. Therefore, when the adhesive 24 is sufficiently heated the barrier layer 14 is bonded to both the interior layer 12 and the face layer 18. In addition, the adhesive 24 flows and fills a portion of the stitch holes 28 in the barrier layer 14 and the interior layer 12. In an embodiment, the adhesive 24 found on either side of the intermediate material 26 is the same type and, as such, has the same melting point. In FIG. 3, the barrier layer 14 may be referred to as having an "A-B-A" type format.

Referring now to FIG. 4, in an embodiment the barrier layer 14 of the fabric 10 is formed from an adhesive film 36 (e.g., a polymer-based adhesive film). In such an embodiment, the barrier layer 14 is formed from a single material. When the adhesive film 36 is sufficiently heated, upper and lower portions of the adhesive film 36 (i.e., portions adjacent the face layer 18 and the interior layer 12) melt and fill a portion of the stitch holes 28. In an embodiment, the adhesive film 36 is stretchable to a degree corresponding to the stretch provide by the interior layer 12 and the face layer 18.

Moving on to FIG. 5, in an embodiment the yarn 16 is stitched through each of the interior layer 12, the barrier layer 14, and the face layer 18. In addition, a barrier layer 14 comprising an intermediate material 26 (e.g., a porous membrane or a non-porous film) and an adhesive 24. As shown in FIG. 6, the yarn 16 is again stitched through all three of the layers 12, 14, 18. However, the barrier layer 14 includes the intermediate material 26 disposed between two layers of the adhesive 24. As shown in FIG. 7, a single material (e.g., adhesive film 36) is used for the barrier layer 14 while the yarn 16 is stitched through the layers 12, 14, 18.

Referring now to FIG. 8, in an embodiment a single-layer stitched fabric 60 may be formed. As shown in FIG. 8, the fabric 60 is free of a face layer 18 and an interior layer 12. In other words, the face layer 18 and the interior layer 12 of the multi-layer stitched fabric 10 have been eliminated. As such, the yarn 16 and the barrier layer 14 are free from contact by another layer on either side of the barrier layer. In an embodiment, the barrier layer 14 comprises the adhesive film 36 that, when melted, will fill a portion of the stitch holes formed in the barrier layer 14 by the yarn 16.

In various embodiments, the single-layer stitched fabric 60 may share one or more of the characteristics or features disclosed herein with regard to the multi-layer stitched fabric 10. For example, in an embodiment the barrier layer 14 may be a water resistant or waterproof material such as, for example, the adhesive 24 and/or intermediate layers 26 used in the multi-layer stitched fabric 10 (FIG. 6). In addition, in an embodiment the yarn 16 used in the single-layer fabric 60 may be contractible or non-contractible.

Referring now to FIG. 9, in an embodiment a fabric 90 may be formed. As shown, the fabric 90 includes the barrier layer 14, a batting layer 92, and the yarn 16. The batting layer 92 is disposed over the barrier layer 14 and provides insulation and stability to the fabric 92. In an embodiment, the batting layer 92 is formed from a batting material 94 such as, for example, wool, cotton, polyester, nylon, or another suitable batting material. In an embodiment, the batting layer 92 may be formed from "loose fill" such as, for example, down, chopped fiber, staple fibers, nonwovens, and so on. In an embodiment, the batting material 94 is spun-bonded, felted, needle punched, fiberfill (replacing down), quilted filling, composites, and so on.

In an embodiment, the batting material 94 may be chemically treated or put through a felting/spun-bonded process to impart desirable characteristics to the batting material 94. In an embodiment, the batting material 94 is three inch wool fibers that are randomly oriented when introduced into the fabric 90. In an embodiment, the batting material 94 may be subjected to needling at ten stitches and ten courses to ensure that the three inch wool fibers are locked down ten times in both directions. In embodiments where the batting material 94 comprises synthetic fibers or natural fibers other than wool, a fiber length of less than three inches may be suitable.

As shown, the yarn 16 is stitched through and forms stitch holes in the barrier layer 14 and the batting layer 92. As before, in an embodiment a melted portion of the barrier layer 14 may be used to fill a portion of the stitch holes in the barrier layer 14.

Referring now to FIG. 10, in an embodiment a fabric 100 may be formed. The fabric 100 includes the interior layer 12, the batting layer 92, the barrier layer 14, the face layer 18, and the yarn 16. As shown, the batting layer 92 is disposed over the interior layer 12, the barrier layer 14 is disposed over the batting layer 92, and the face layer 18 is disposed over the barrier layer 14.

In an embodiment, the yarn 16 is stitched through and secures together the interior layer 12, the batting layer 92, the barrier layer 14, and the face layer 18. In such an embodiment, the barrier layer 14 is not used as a bonding agent. In another embodiment, the yarn 16 is stitched through and secures together the interior layer 12, the batting layer 92, and the barrier layer 14 and a melted portion of the barrier layer 14 bonds the face layer 18 and the barrier layer 14 together. As before, the melted portion of the barrier layer 14 may be used to fill a portion of the stitch holes in the barrier layer 14 to, for example, increase wind/water resistance.

Referring now to FIG. 11, in an embodiment a fabric 110 may be formed. As shown, the fabric 110 includes the face layer 18, the barrier layer 14, the batting layer 92, a yarn 112, and the yarn 16. The yarn 112 is disposed over the batting layer 92. In an embodiment, the yarn 16 secures the yarn 112 to the batting layer 92. In an embodiment, the yarn 16 also secures the face layer 18, the barrier layer 14, and the batting layer 92 together. As before, a melted portion of the barrier layer 14 may be used to fill a portion of the stitch holes formed by the yarn 16.

Optionally, the face layer 18 may be omitted from the fabric 110. In addition, in an embodiment the face layer 18 may be replaced with another laid in layer of yarn similar to yarn 112. In other words, the yarn 112 may be disposed on opposing sides of the fabric 110.

FIG. 12 is a representative portion of the fabric 110 of FIG. 11 when viewed from below. When the fabric 110 is viewed from below, the yarn 112 forms a distinct pattern. In an embodiment, the yarn 112 is held in place by the yarn 16. In other words, the yarn 112 and the yarn 16 are knitted or stitched together. In an embodiment, the yarn 112 and the yarn 16 are simultaneously stitched. In an embodiment, additional yarns similar to yarn 112 may be employed and disposed over the batting layer 92. In other words, several layers or passes of the yarn 112 may be utilized.

In an embodiment, the yarn 16 passes over two strands of the yarn 112 before being inserted into and passing through the batting layer 92. In other words, the yarn 16 is moving three needles. Even so, the yarn 16 may be otherwise configured. For example, the yarn 16 can skip over a single row or more than two rows. The number of rows that can be skipped over depends on the physical limitation of how many vertical stitches can be crossed. In an embodiment, the yarn 16 exhibits a zig-zag pattern on the bottom surface of the fabric 110. Even so, the yarn 16 may form a variety of different patterns.

In an embodiment, the position of the batting layer 92 and the barrier layer 14 within the fabrics disclosed herein may be swapped. For example, to provide additional warmth to the wearer of a garment using the fabrics disclosed herein the batting layer 92 may be situated closer to the user than the barrier layer 14. In other words, the barrier layer 14 is outside the batting layer 92 from the perspective of the wearer of the garment. In an embodiment, the fabrics disclosed herein may include a batting layer 92 on either side of the barrier layer 92. In other words, the fabrics may incorporate more than one batting layer 92. The fabrics disclosed herein may be incorporated into or used for garments, footwear, filtration, outdoor clothing and equipment, and so on.

Figure 15:
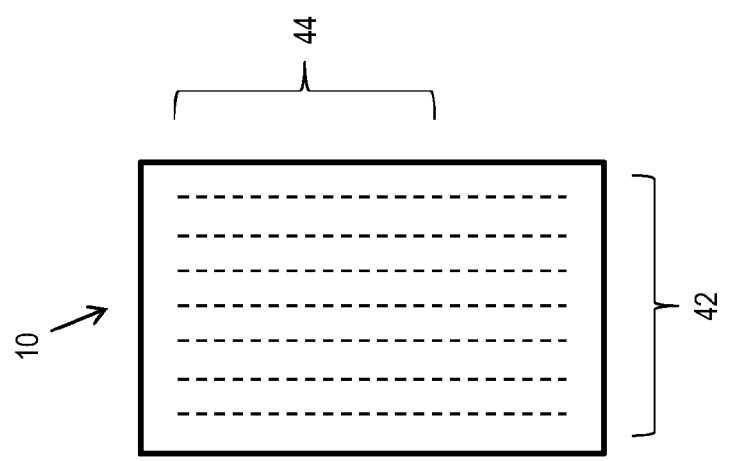
FIG. 15 is an embodiment of a stitch pattern for the stitched multi-layer fabric of FIG. 1.

In FIG. 13, a method 38 of forming the stitched multi-layer fabric 10 is illustrated. In block 40, the interior layer 12 is stitched to the barrier layer 14. As shown in FIG. 15, in an embodiment seven needles 40 per inch and fourteen courses 42 per inch are used in the stitching process.

Referring back to FIG. 13, in block 44 the face layer 18 is disposed over the barrier layer 14 after the stitching process has been completed. Thereafter, in block 46, a portion of the barrier layer 14 is melted to bond the face layer 18 to the barrier layer 14 and to fill a portion of the stitch holes 28 formed in the barrier layer during stitching.

In an embodiment, the barrier layer 14 is heated to or above about 140° C. (about 284° F.) to melt, for example, the adhesive 24 but not the intermediate material 26. In another embodiment, the barrier layer 14 is heated to between about 140° C. to about 180° C. (about 284° F. to about 356° F.) to melt, for example, the adhesive 24 but not the intermediate material 26. In yet another embodiment, the barrier layer 14 is heated to a temperature less than a set temperature of the interior layer 12 or the face layer 18, which may be about 360° C. (about 680° F.) or less depending on the materials used for those layers. In other embodiments, depending on the materials used the barrier layer 14 may be otherwise heated to a greater or lesser temperature.

Figure 14:
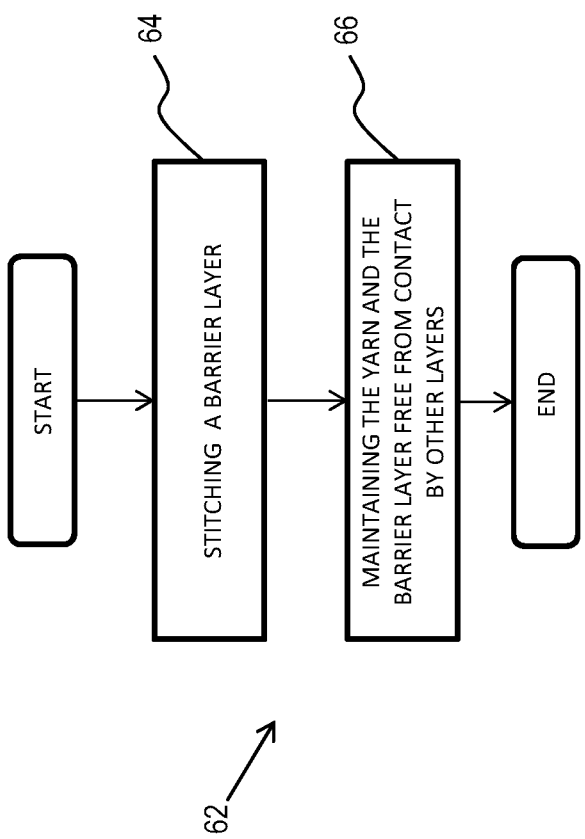
FIG. 14 is an embodiment of a method of forming the stitched multi-layer fabric of FIG. 8.

In FIG. 14, a method 62 of forming the stitched single-layer fabric 10 is illustrated. In block 64, the barrier layer 14 is stitched with the yarn 16. The yarn 16 may protrude from one or both surfaces (i.e., the top and bottom surfaces) of the barrier layer 14 after the stitching process. In addition, the yarn 16 may be stitched in a variety of different plain or patterned configurations and from more than one direction (e.g., top to bottom, left to right, diagonally, and so on). Moreover, the yarn 16 may be stitched in several passes whereby later-stitched portions of the yarn 16 are stitched over previously-stitched portions of the yarn 16.

In an embodiment, the yarn 16 may be stitched into the barrier layer 14 in such an amount that the barrier layer 14 is not visible or only slightly visible apart from the yarn 16. In addition, the amount of yarn 16 used in the stitching process may depend on numerous factors such as, for example, the desired weight of the finished fabric 60, the cost of the yarn 16, the type of the yarn used, the size of the yarn 16, the overall look and feel of the finished fabric 60, and so on.

In block 66, the yarn 16 and the barrier layer 14 are maintained free from contact by another layer (e.g., the interior layer 12 and the face layer 18) on either side of the barrier layer. In an embodiment, the method 62 may also include melting a portion of the barrier layer 14 to fill stitch holes formed in the barrier layer during stitching as described above with regard to fabric 10.

Figure 16:
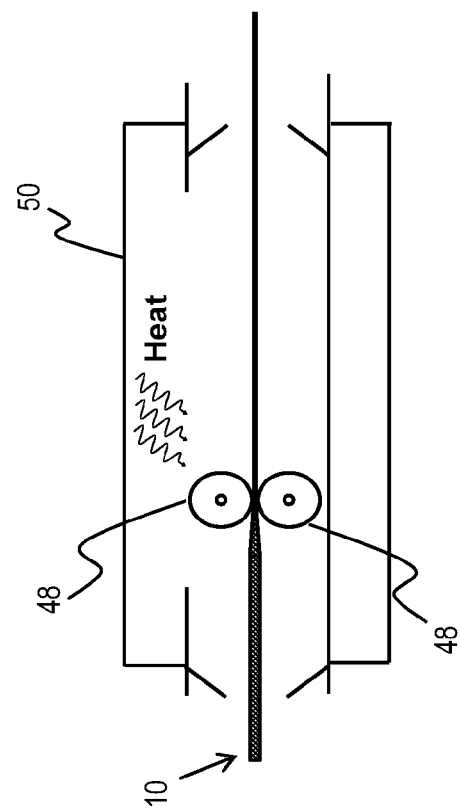
FIG. 16 is an embodiment of a heating device used to heat the barrier layer of the stitched multi-layer fabric of FIG. 1 and the stitched single-layer fabric in order to promote lamination.

Referring to FIG. 16, in an embodiment a portion of the barrier layer 14 is melted by feeding the fabric 12 through a pair of nip laminators 48 disposed in an oven 50. In an embodiment, the fabric 10 is moved through the oven 50 at approximately five yards per minute and at a temperature of approximately 180° C. (284° F.). The gap between opposing nip laminators 48 may be varied to subject the layers 12, 14, 18 to more or less pressure. Other settings and parameters may be used during the heating and/or melting process involving, for example, the nip laminators 48 and the oven 50.

In some embodiments, the fabric 10 or the individual layers 12, 14, 18 may undergo additional processing or treatment to impart desirable characteristics, qualities, or traits. For example, the interior and face layers 12, 18 or the fabric 10 may be dyed or treated with a fabric softener. In addition, an antimicrobial may also be sprayed onto the layers 12, 18 or the fabric 10. In addition, a finish that makes the layers 12, 18 or the fabric 10 water repellant or that encourages wicking may be applied.

Examples of illustrative embodiments are provided in the following paragraphs:

Example 1

In one example, the fabric 10 of FIG. 1 (with heat as Shown in FIG. 10) was constructed using a face layer 18 formed from woven wool face (57% wool/37% nylon/6% Spandex), a barrier layer 14 formed from a 3 mil urethane adhesive film (Stephens ST3995), and an interior layer 12 formed from wool pile (75.5% wool/24.5% black textured polyester). The yarn 16 was a 40 denier 13 black nylon air covered over 70 denier clear Spandex. The fabric 10 was heated to 180° C. and run through the oven at 5 meters per minute with a 2 mm gap/tunnel height.

The fabric 10 of FIG. 1 was tested under ASTM D-751 Procedure B Water Resistance and provided a result of 27.3 centimeters. In addition, the fabric 10 of FIG. 1 was tested under ASTM D-737 Air Perm and provided a result of 5.15 cubic feet per square foot per minute (ft3/ft2/min).

Example 2

In one example, the fabric 10 of FIG. 5 (with heat as Shown in FIG. 10) was constructed using a face layer 18 formed from woven wool face (57% wool/37% nylon/6% Spandex), a barrier layer 14 formed from a 3 mil urethane adhesive film (Stephens ST3995), and an interior layer 12 formed from wool pile (75.5% wool/24.5% black textured polyester). The yarn 16 was a 40 denier 13 black nylon air covered over 70 denier clear Spandex. The fabric 10 was heated to 180° C. and run through the oven at 5 meters per minute with a 2 mm gap/tunnel height.

The fabric 10 of FIG. 5 was tested under ASTM D-751 Procedure B Water Resistance and provided a result of 18.7 centimeters. In addition, the fabric 10 of FIG. 5 was tested under ASTM D-737 Air Perm and provided a result of 1.004 cubic feet per square foot per minute (ft3/ft2/min).

Example 3

In one example, the fabric 10 of FIG. 5 (without heat as Shown in FIG. 10) was constructed using a face layer 18 formed from woven wool face (57% wool/37% nylon/6% Spandex), a barrier layer 14 formed from a 3 mil urethane adhesive film (Stephens ST3995), and an interior layer 12 formed from wool pile (75.5% wool/24.5% black textured polyester). The yarn 16 was a 40 denier 13 black nylon air covered over 70 denier clear Spandex.

The fabric 10 of FIG. 5 was tested under ASTM D-751 Procedure B Water Resistance and provided a result of 15.2 centimeters. In addition, the fabric 10 of FIG. 5 was tested under ASTM D-737 Air Perm and provided a result of 3.47 cubic feet per square foot per minute (ft3/ft2/min).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A stitched multi-layer fabric, comprising:
 a barrier layer configured to inhibit fluid flow;
 a first laid in layer of yarn disposed over a first side of the barrier layer;
 a batting layer disposed over a second side of the barrier layer, the second side of the barrier layer opposite the first side; and
 a stitch yarn securing the first laid in layer of yarn to the barrier layer, securing the barrier layer and the batting layer together, and forming stitch holes in the barrier layer,
 wherein a melted portion of the barrier layer fills a portion of the stitch holes in the barrier layer.

2. The fabric of claim 1, wherein a second laid in layer of yarn is disposed over the batting layer, and wherein the stitch yarn secures the second laid in layer of yarn to the batting layer.

3. The fabric of claim 1, wherein the barrier layer comprises a first material with a first melting point and a second material with a second melting point, and wherein the first melting point is lower than the second melting point.

4. The fabric of claim 1, wherein the batting layer is formed from at least one of wool, cotton, polyester, and nylon.

5. The fabric of claim 1, wherein the barrier layer is elastomeric.

6. The fabric of claim 1, wherein the batting layer is formed from a batting material, and wherein the batting material has been chemically treated to enhance a characteristic of the batting material.

7. The fabric of claim 1, wherein the batting layer is formed from a batting material, and wherein the batting material is formed from randomly-oriented wool fibers.

8. The fabric of claim 1, wherein the batting layer is formed from at least one synthetic fiber.

9. The fabric of claim 1, wherein the batting layer is formed from natural fibers other than wool, and wherein the natural fibers have a fiber length of less than three inches.

* * * * *